United States Patent
Friend et al.

(10) Patent No.: US 6,609,716 B2
(45) Date of Patent: Aug. 26, 2003

(54) WIPER SEAL

(75) Inventors: Anthony David Friend, Darien, IL (US); Steven Louis Arianoutsos, Washington, IL (US); Bart James Ferrero, Chillicothe, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 10/025,495

(22) Filed: Dec. 26, 2001

(65) Prior Publication Data

US 2003/0116920 A1 Jun. 26, 2003

(51) Int. Cl.⁷ .............................................. F16J 15/32
(52) U.S. Cl. ........................ 277/550; 277/552; 277/568
(58) Field of Search ................................ 277/550, 552, 277/565, 568, 572

(56) References Cited

U.S. PATENT DOCUMENTS

| | | | | |
|---|---|---|---|---|
| 2,274,234 A | * | 2/1942 | Ekkebus et al. | 277/565 |
| 2,868,566 A | * | 1/1959 | Kosatka | 277/575 |
| 2,896,432 A | * | 7/1959 | Hempel | 464/131 |
| 2,992,027 A | * | 7/1961 | Wright et al. | 277/565 |
| 3,194,571 A | * | 7/1965 | Peickii et al. | 277/565 |
| 3,685,838 A | * | 8/1972 | Malmstrom | 277/560 |
| 3,720,418 A | | 3/1973 | Berg | |
| 3,830,508 A | | 8/1974 | Endicott | |
| 4,141,562 A | * | 2/1979 | Wu | 277/309 |
| 4,258,927 A | | 3/1981 | Cather, Jr. | |
| 4,284,280 A | * | 8/1981 | Bertram et al. | 277/558 |
| 4,289,321 A | * | 9/1981 | Cather, Jr. | 277/552 |
| 4,327,924 A | * | 5/1982 | Wheeler | 277/551 |
| 4,359,228 A | | 11/1982 | Cather | |
| 4,427,206 A | * | 1/1984 | Sugiyama | 277/568 |
| 4,618,153 A | | 10/1986 | Nilsson | |
| 4,709,932 A | | 12/1987 | Edlund et al. | |
| 4,819,952 A | * | 4/1989 | Edlund | 277/589 |
| 4,844,480 A | * | 7/1989 | Gralka | 277/552 |
| 4,953,876 A | * | 9/1990 | Muller | 277/556 |
| 4,984,812 A | | 1/1991 | Wada et al. | |
| 5,088,745 A | * | 2/1992 | Peppiatt et al. | 277/579 |
| 5,137,285 A | | 8/1992 | Pick | |
| 5,213,343 A | | 5/1993 | White, Jr. | |
| 5,263,404 A | | 11/1993 | Gaucher et al. | |
| 5,288,086 A | | 2/1994 | Kiesel | |
| 5,380,016 A | * | 1/1995 | Reinsma et al. | 277/503 |
| 5,503,408 A | | 4/1996 | Hemann et al. | |
| 5,597,356 A | * | 1/1997 | Rieder | 464/131 |
| 5,947,080 A | | 9/1999 | Weissman et al. | |
| 5,957,461 A | | 9/1999 | Ulrich | |
| 6,029,980 A | * | 2/2000 | Downes | 277/552 |
| 6,045,137 A | * | 4/2000 | Friend et al. | 277/560 |
| 6,116,613 A | | 9/2000 | Friend et al. | |

* cited by examiner

Primary Examiner—Anthony Knight
Assistant Examiner—Alison K. Pickard
(74) Attorney, Agent, or Firm—Finnegan, Henderson, Farabow, Garrett & Dunner; Steve M Hanley

(57) ABSTRACT

A wiper seal for a hydraulic component is provided. The wiper seal includes a support member with a first leg that has an inner surface, a first end, and a second end and that extends substantially parallel to a reference axis. The support member further includes a second leg that has an outer surface extending substantially perpendicular to the reference axis from the first end of the first leg. The wiper seal also includes a body portion that defines an opening therethrough and includes an outer peripheral surface configured to receive the inner surface of the first leg of the support member. A first radial face extends substantially coplanar with the outer surface of the second leg and a second radial face extends generally perpendicular to the reference axis from the second end of the first leg of the support member. The second radial face includes a cutout defining a first cavity. An inner surface defines a first sealing lip adjacent the first radial face. A projection extends from the inner surface to a second sealing lip. The second sealing lip is separated from the first sealing lip by a second cavity.

13 Claims, 2 Drawing Sheets

WIPER SEAL

TECHNICAL FIELD

The present invention is directed to a wiper seal for a hydraulic component. More particularly, the present invention is directed to a wiper seal for a rod in a hydraulic component.

BACKGROUND

Many work machines, such as tractors, excavators, loaders, and other earth moving equipment, utilize hydraulic components to generate the force required to accomplish their tasks. These hydraulic components, which include, for example, hydraulic actuators, hydraulic cylinders, and fluid motors, typically include two fluid chambers disposed on opposite sides of a moveable element. Pressurized fluid is introduced into one of the fluid chambers, which causes the moveable element to move relative to the hydraulic component housing.

The moveable element is usually connected to a work implement on the work machine through a rod or shaft. Typically, each hydraulic component includes a sealing arrangement that prevents pressurized fluid from leaking from the fluid chambers of the hydraulic component during use. One such sealing arrangement for a hydraulic cylinder is described in U.S. Pat. No. 6,116,613.

A sealing arrangement for a hydraulic component may include a series of seals. In one such sealing arrangement for a hydraulic cylinder, three seals are disposed in the cylinder head to engage the shaft proximate the exit point of the shaft. The cylinder head typically includes a series of annular grooves, or counter bores, that are configured to receive each of the three seals. The first seal, which is placed closest to the pressurized fluid, is known as a buffer seal. The buffer seal forms a high pressure seal with the shaft to prevent the pressurized fluid from escaping the hydraulic cylinder. Due to the high operating pressures of the hydraulic cylinders, however, some of the pressurized fluid will leak through the buffer seal.

The second seal, which is placed on the opposite side of the buffer seal from the fluid chamber is known as a "U-cup" seal. This seal typically has a notch or groove that forms a "U" shape. This seal provides a second barrier to prevent the fluid that has leaked through the buffer seal from escaping the hydraulic cylinder. This fluid is captured in a gap between the buffer seal and the "U-cup" seal and in the notch or groove in the seal. When operating conditions permit, the buffer seal allows the captured fluid to bypass the buffer seal and return to the system.

The third seal, or the outermost seal, is known as a wiper seal or, alternatively, as a rod seal or a rod scraper seal. The wiper seal typically includes a lip that forms a seal with the surface of the shaft to prevent dirt or debris from entering the system and contaminating the fluid. Under certain operating conditions, however, fluid may leak through the U-cup seal and collect in the area between the wiper seal and the U-cup seal. The dirt preventative seal formed by the engagement of the wiper seal lip with the surface of the shaft may not effectively prevent the fluid that collects between the wiper seal and the U-cup seal from leaking past the wiper seal and out of the housing.

When fluid leaks from the hydraulic component, the amount of maintenance required by the hydraulic component may be increased. For example, the lost fluid will have to be replaced. In addition, the fluid that leaks out of the housing may adhere to the surface of the shaft. The presence of fluid on the shaft may increase the amount of dirt and debris that adheres to the surface of the shaft, which may increase the possibility of system contamination.

The wiper seal of the present invention is directed to solving all or some of the problems set forth above.

SUMMARY OF THE INVENTION

One aspect of the invention is directed to a wiper seal for a hydraulic component. The wiper seal includes a support member that has a first leg with an inner surface, a first end, and a second end and that extends substantially parallel to a reference axis. The support member includes a second leg having an outer surface that extends substantially perpendicular to the reference axis from the first end of the first leg. The wiper seal also includes a body portion defining an opening therethrough. The body portion includes an outer peripheral surface configured to receive the inner surface of the first leg of the support member. A first radial face extends substantially coplanar with the outer surface of the second leg. A second radial face extends generally perpendicular to the reference axis from the second end of the first leg of the support member and includes a cutout defining a first cavity. An inner surface defines a first sealing lip that is adjacent the first radial face. A projection extends from the inner surface to a second sealing lip. The second sealing lip is separated from the first sealing lip by a second cavity.

According to another aspect, the present invention is directed to a hydraulic component that includes a housing defining at least one chamber configured to hold a pressurized fluid. The housing has a head defining an opening. A rod having a surface is disposed in the opening of the housing. A wiper seal is disposed in the housing and includes a support member that has a first leg with an inner surface, a first end, and a second end and that extends substantially parallel to a reference axis. The support member includes a second leg having an outer surface that extends substantially perpendicular to the reference axis from the first end of the first leg. The wiper seal also includes a body portion defining an opening therethrough. The body portion includes an outer peripheral surface configured to receive the inner surface of the first leg of the support member. A first radial face extends substantially coplanar with the outer surface of the second leg. A second radial face extends generally perpendicular to the reference axis from the second end of the first leg of the support member and includes a cutout defining a first cavity. An inner surface defines a first sealing lip that is adjacent the first radial face. A projection extends from the inner surface to a second sealing lip. The second sealing lip is separated from the first sealing lip by a second cavity.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate an exemplary embodiment of the invention and together with the description, serve to explain the principles of the invention. In the drawings.

DETAILED DESCRIPTION

Reference will now be made in detail to an embodiment of the present invention, an example of which is illustrated in the accompanying drawings. Wherever possible, the same reference numbers will be used throughout the drawings to refer to the same or like parts.

Figure 1:
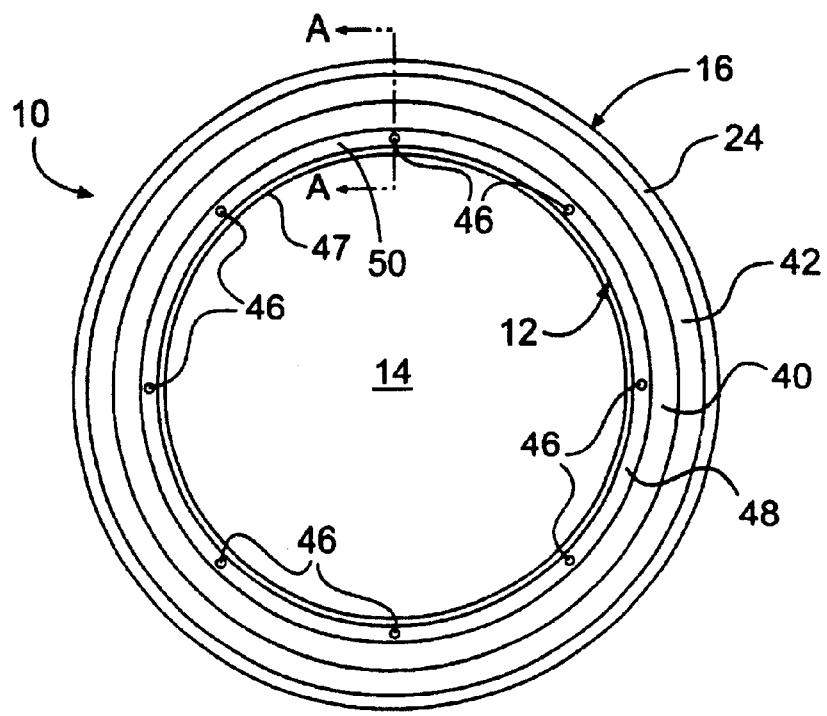
FIG. 1 is a side view of a wiper seal in accordance with an exemplary embodiment of the present invention.

As illustrated in the accompanying drawings, a wiper seal 10, which may also be referred to as a rod seal or a rod scraper seal, for a hydraulic component 54 is provided. As illustrated in FIG. 1, wiper seal 10 includes a body portion 12 and a support member 16. Both body portion 12 and support member 16 may have a substantially circular shape and define a substantially circular opening 14. In an exemplary embodiment, body portion 12 may be constructed of an elastomeric material, whereas support member 16 may be constructed of a metallic material.

Figure 2:
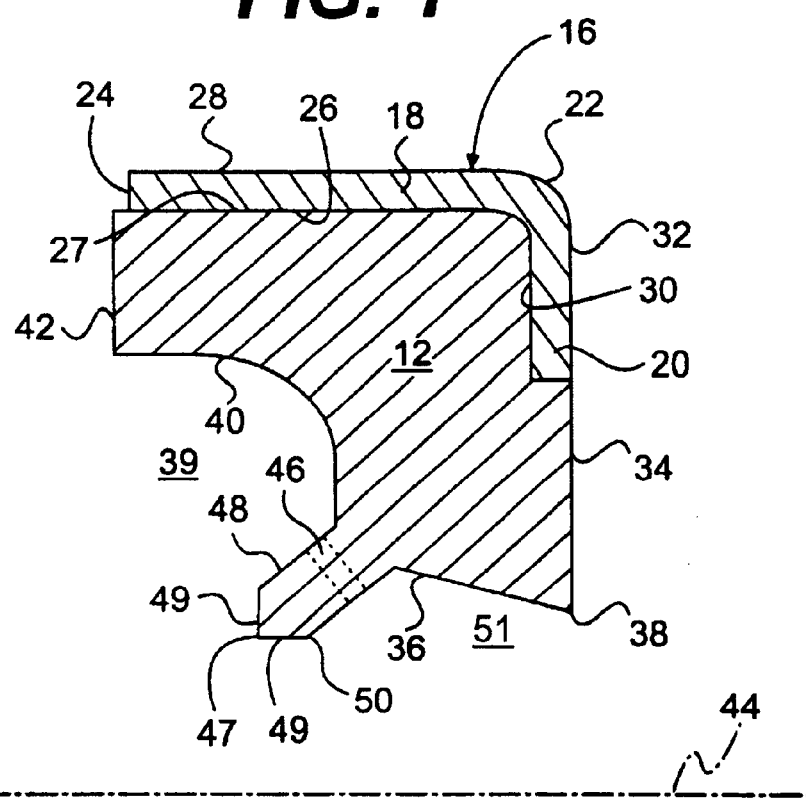
FIG. 2 is a cross-sectional view of the wiper seal of FIG. 1, taken along line A—A.

As illustrated in FIG. 2, support member 16 includes a first leg 18 that extends substantially parallel to a reference axis 44. First leg 18 includes an inner surface 26 and an outer surface 28. First leg 18 also includes a first end 22 and a second end 24.

Support member 16 also includes a second leg 20. Second leg 20 extends substantially perpendicular to reference axis 44 from first end 22 of first leg 18. Second leg 20 includes an inner surface 30 and an outer surface 32.

As also shown in FIG. 2, body portion 12 includes an outer peripheral surface 27. Outer peripheral surface 27 is configured to receive inner surface 26 of support member first leg 18. Outer peripheral surface 27 may extend past second end 24 of first leg 18.

Body portion 12 also includes a first radial face 34. First radial face 34 extends substantially perpendicular to reference axis 44. First radial face 34 is substantially co-planar with outer surface 32 of second leg 20.

As further shown in FIG. 2, body portion 12 includes an inner surface 36. Inner surface 36 may extend at an angle relative to reference axis 44 and connect with first radial face 34. The connection point between inner surface 36 and first radial face 34 forms a first sealing lip 38.

Body portion 12 also includes a projection 48 that extends from inner surface 36 to a tip 47. Projection 48 may be cantilevered into a first cavity 39. Projection 48 defines a second sealing lip 50 that is separated from first sealing lip 38 by a second cavity 51.

Projection tip 47 may include chamfered surfaces 49. In addition, projection 48 may include an opening 46 that connects first cavity 39 second cavity 51. As shown in FIG. 1, projection 48 may further include a plurality of openings disposed around wiper seal 10.

Body portion 12 also includes a second radial face 42. Second radial face 42 extends substantially perpendicular to reference axis 44. Second radial face 42 may be disposed a location that is past second end 24 of support member first leg 18. In other words, a section of body portion 12 extends past the second end 24 of support member first leg 18.

Body portion 12 may also include a cutout section defined by a cutout surface 40. Cutout surface 40 defines the first cavity 39. Cutout surface 40 may have a curved shape and extend from second radial face 42 to projection 48.

Figure 3:
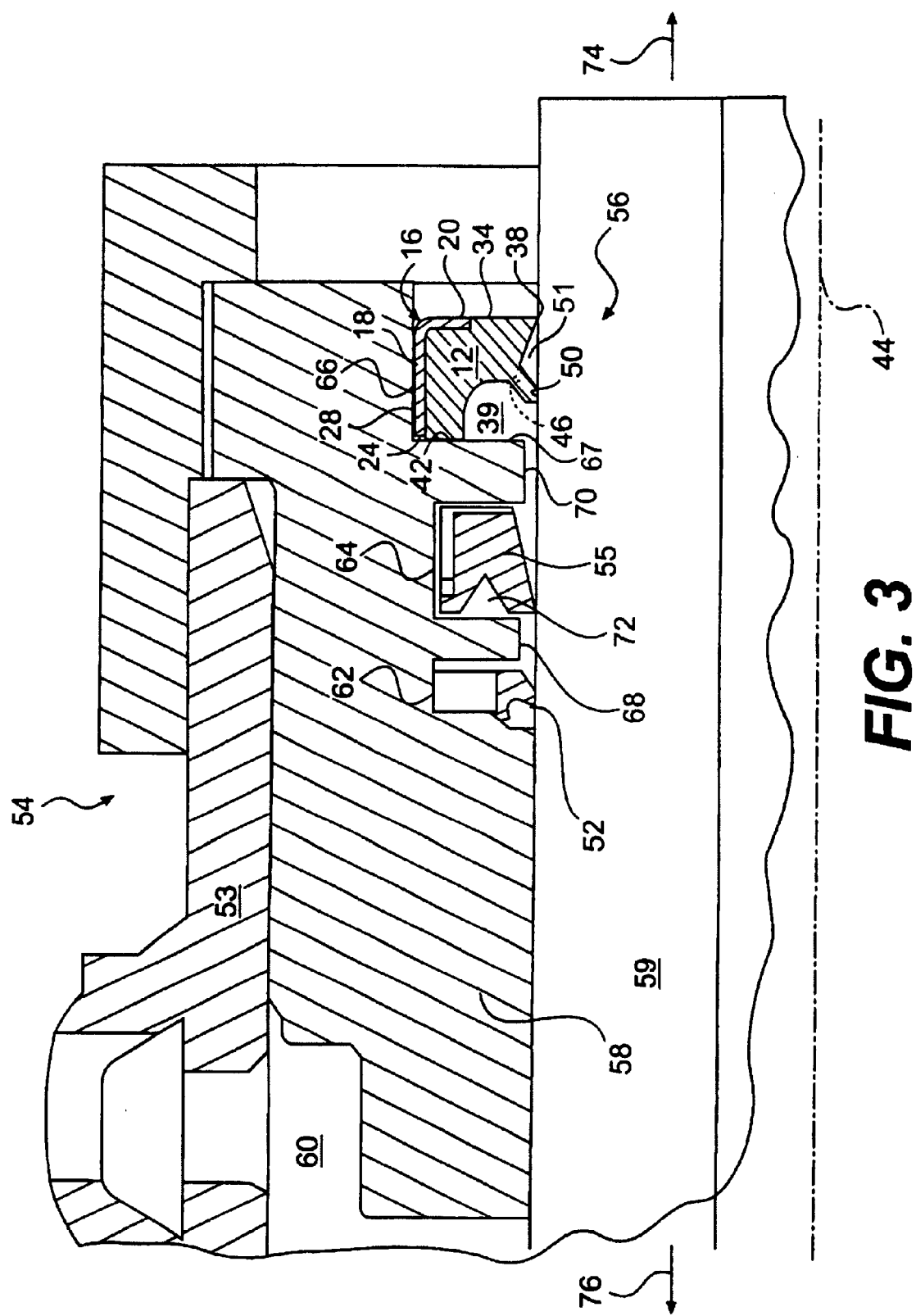
FIG. 3 is a cross-sectional view of a portion of a hydraulic component in accordance with an exemplary embodiment of the present invention.

As shown in FIG. 3, wiper seal 10 may be incorporated as part of a sealing assembly 56 for a hydraulic component 54.

Hydraulic component 54 includes a housing 53 that defines at least one fluid chamber 60. A cylinder head 58 having three annular grooves 62, 64, and 66 caps one end of housing 53. A rod 59 is slidably received in an opening of cylinder head 58.

Sealing assembly 56 includes a buffer seal 52, a U-cup seal 55, and wiper seal 10. Buffer seal 52 is placed in first annular groove 62. U-cup seal 55 is placed in second annular groove 64. Wiper seal 10 is placed in third annular groove 66.

Each of the buffer seal 52, U-cup seal 55, and wiper seal 10 engage a portion of the surface of rod 59 to form three separate seals. As illustrated, buffer seal 52 is positioned closest to fluid chamber 60. Wiper seal 10 is the outermost seal. U-cup seal 55 is disposed between buffer seal 52 and wiper seal 10. A first gap 68 separates buffer seal 52 from U-cup seal 55 and a second gap 70 separates U-cup seal 55 from wiper seal 10.

One function of buffer seal 54, as the seal closest to fluid chamber 60, is to create a high-pressure seal to prevent the escape of fluid from fluid chamber 60. It is expected, however, that some fluid will leak through buffer seal 52 along the surface of rod 59. This fluid will collect in first gap 68.

U-cup seal 55 provides a second barrier to prevent fluid from leaking out of housing 58. Fluid that leaks through buffer seal 52 and collects in first gap 68 is scraped from the surface of rod 59 by the lip of the U-cup seal 55. This fluid collects in a recess 72 in U-cup seal 55. When the pressure of the fluid in fluid chamber 60 decreases to a relatively low level, the pressure of the fluid in recess 72 and first gap 68 acts on buffer seal 52 to move the lip of buffer seal 52 out of engagement with the surface of rod 59. The disengagement of buffer seal 52 from the surface of rod 59 allows the trapped fluid to return to fluid chamber 60.

One function of wiper seal 10, as the outermost seal, is to prevent dirt and debris from contaminating fluid of hydraulic component 54. Wiper seal 10 is typically forcibly fit into third annular groove 66. Outer surface 28 of support member first leg 18 engages a surface of third annular groove 66 to ensure that wiper seal 10 remains in place within third annular groove 66. Second radial face 42, which, as described previously, extends past second end 24 of support member first leg 18 also engages a surface 67 of third annular groove 66. The engagement of second radial face 42 with surface 67 of third annular groove 66 creates a seal that prevents fluid from escaping housing 53 between wiper seal 10 and cylinder head 58.

When wiper seal 10 is in place in cylinder head 58, rod 59 may be inserted through opening 14 in wiper seal 10. Each of first sealing lip 38 and second sealing lip 50 engage the surface of rod 59. In this installed position, first sealing lip 38 and second sealing lip 50 lie along a line that is generally parallel to reference axis 44.

Opening 14 is configured to have a close tolerance with the surface of rod 59 so that first sealing lip 38 forms a compression type seal with the surface of rod 59. In other words, the insertion of rod 59 into opening 14 compresses first radial face 34. In response, the elastomeric properties of body portion 12 cause first sealing lip 38 to exert a force on the surface of rod 59, thereby creating a seal. When rod 59 is withdrawn into housing 53, i.e. moved in the direction indicated by arrow 76, first sealing lip 38 scrapes any dirt or debris from the surface of rod 59. This prevents dirt or debris, which may adhere to the surface of rod 59 during ordinary operation, from entering housing 53 and contaminating the system fluid.

Second sealing lip 50 of projection 48 also engages the surface of rod 49. Because projection 48 is cantilevered from body portion 12, the force exerted by projection 48 on the surface of rod 59 is less than the force exerted by first sealing lip 38. When rod 59 is extended from housing 53, i.e. moved in the direction indicated by arrow 74, second sealing lip 50 scrapes fluid from surface of rod 59. The fluid scraped from the surface of rod 59 by second sealing lip 50 may collect in first cavity 39.

If the pressure of the fluid collected in first cavity 39 increases to a certain level, the force exerted on wiper seal 12 may dislodge the seal from third annular groove 66. Opening 46 in projection 48 may assist in dissipating the pressure of the fluid in first cavity 39. When a certain amount of fluid collects in first cavity 39, some of the fluid may flow through opening 46 and into second cavity 51. The fluid in second cavity 51 may then adhere to the surface of rod 59 as the rod extends from housing 53. In this manner, any potential pressure build-up in first cavity 39 may be avoided, which may prevent wiper seal 12 from being dislodged from third annular groove 66.

INDUSTRIAL APPLICABILITY

As will be apparent from the foregoing disclosure, the present invention provides a wiper seal for a hydraulic component that will prevent dirt and/or debris from entering the system and contaminating the system fluid. In addition, the wiper seal of the present invention provides an additional barrier to prevent fluid from leaking out of the component housing. This is accomplished by providing a compression-type outer seal that acts as a dirt barrier and a cantilever-type inner seal that acts as a fluid seal.

The present invention may be incorporated into the sealing assembly of any hydraulic component. Thus, the wiper seal of the present invention has wide applications in a variety of machines that include hydraulic components, such as hydraulic actuators and hydraulic cylinders. The present invention provides advantages in that it improves the sealing characteristics of the sealing assembly and reduces the amount of maintenance required to keep the hydraulic component operating.

It will be apparent to those skilled in the art that various modifications and variations can be made in the disclosed seal without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims and their equivalents.

What is claimed is:

1. A wiper seal for a hydraulic component, comprising:
   a support member including a first leg having an inner surface, a first end, and a second end and extending substantially parallel to a reference axis and a second leg having an outer surface extending substantially perpendicular to the reference axis from the first end of the first leg; and
   a body portion defining an opening therethrough and including:
      an outermost peripheral surface configured to receive the inner surface of the first leg of the support member;
      a first radial face extending substantially coplanar with the outer surface of the second leg;
      a second radial face extending generally perpendicular to the reference axis from the second end of the first leg of the support member and including a cutout defining a first cavity;
      an inner surface defining a first sealing lip at the connection point between the inner surface and the first radial face, said first sealing lip adapted to scrape dirt or debris from the surface of the rod; and
      a projection extending from the inner surface to a second sealing lip adapted to remove fluid from the surface of the rod, the second sealing lip separated from the first sealing lip by a second cavity, the projection including at least one opening extending from the first cavity to the second cavity to allow a flow of fluid between the first and second cavities.

2. The wiper seal of claim 1, wherein the projection extends into the first cavity and the first and second sealing lips lie on a plane generally parallel to the reference axis.

3. The wiper seal of claim 1, wherein the projection includes a plurality of openings extending from the first cavity to the second cavity.

4. The wiper seal of claim 1, wherein the first cavity has a curved surface.

5. The wiper seal of claim 1, wherein the body portion is formed of an elastomeric material and the support member is formed of a metallic material.

6. A hydraulic component, comprising:
   a housing defining at least one chamber configured to hold a pressurized fluid, the housing having a head defining an opening;
   a rod having a surface and moveably disposed in the opening of the housing; and
   a wiper seal disposed in the housing and including:
      a support member including a first leg having an inner surface, a first end, and a second end and extending substantially parallel to a reference axis and a second leg having an outer surface extending substantially perpendicular to the reference axis from the first end of the first leg; and
      a body portion defining an opening therethrough and including:
         an outermost peripheral surface configured to receive the inner surface of the first leg of the support member;
         a first radial face extending substantially coplanar with the outermost surface of the second leg;
         a second radial face extending generally perpendicular to the reference axis from the second end of the first leg of the support member and including a cutout defining a first cavity;
         an inner surface defining a first sealing lip at the connection point between the inner surface and the first radial face, said first sealing lip adapted to scrape dirt or debris from the surface of the rod; and
         a projection extending from the inner surface to a second sealing lip adapted to remove fluid from the surface of the rod, the second sealing lip separated from the first sealing lip by a second cavity, the projection including at least one opening extending from the first cavity to the second cavity to allow a flow of fluid between the first and second cavities.

7. The hydraulic component of claim 6, further including a second seal and a third seal, each of the second and third seals configured to engage the surface of the rod between the at least one chamber and the wiper seal.

8. The hydraulic component of claim 7, wherein the second seal is a buffer seal and the third seal is a U-cup seal.

9. The hydraulic component of claim 7, wherein the housing includes a first annular groove configured to receive said second seal, a second annular groove configured to receive the third seal, and a third annular groove configured to receive the wiper seal.

10. The hydraulic component of claim 6, wherein the projection extends into the first cavity and the first and second sealing lips lie on a plane generally parallel to the reference axis.

11. The hydraulic component of claim 6, wherein the projection includes a plurality of openings extending from the first cavity to the second cavity.

12. The hydraulic component of claim 6, wherein the first cavity has a curved surface.

13. The hydraulic component of claim 6, wherein the body portion is formed of an elastomeric material and the support member is formed of a metallic material.

* * * * *